United States Patent
Challa et al.

(10) Patent No.: US 8,995,590 B2
(45) Date of Patent: Mar. 31, 2015

(54) HARDWARE ENGINE TO DEMOD SIMO, MIMO, AND SDMA SIGNALS

(75) Inventors: Raghu N. Challa, San Diego, CA (US); Hemanth Sampath, San Diego, CA (US); Gwendolyn D. Barriac, Encinitas, CA (US)

(73) Assignee: Qualcomm Incorporated, San Diego, CA (US)

( * ) Notice: Subject to any disclaimer, the term of this patent is extended or adjusted under 35 U.S.C. 154(b) by 857 days.

(21) Appl. No.: 12/408,603

(22) Filed: Mar. 20, 2009

(65) Prior Publication Data
US 2009/0304116 A1  Dec. 10, 2009

Related U.S. Application Data

(60) Provisional application No. 61/040,307, filed on Mar. 28, 2008, provisional application No. 61/040,462, filed on Mar. 28, 2008.

(51) Int. Cl.
*H04L 27/06* (2006.01)
*H04L 25/03* (2006.01)

(52) U.S. Cl.
CPC . *H04L 25/03019* (2013.01); *H04L 2025/03426* (2013.01); *H04L 2025/03726* (2013.01)
USPC ............ 375/347; 375/260; 375/267; 375/316

(58) Field of Classification Search
CPC .... H04B 7/0874; H04B 7/0691; H04B 7/061; H04B 7/0697; H04B 7/0808; H04B 7/0814; H04B 7/0854; H04L 1/0618
USPC ................................. 375/260, 267, 316, 347

See application file for complete search history.

(56) References Cited

U.S. PATENT DOCUMENTS

| | | | |
|---|---|---|---|
| 6,760,388 B2 | 7/2004 | Ketchum et al. | |
| 7,773,685 B2 * | 8/2010 | Tirkkonen et al. | 375/267 |
| 7,817,748 B2 * | 10/2010 | Zhu et al. | 375/316 |
| 8,031,794 B2 * | 10/2011 | Mostafa | 375/267 |
| 2004/0008803 A1 | 1/2004 | Aldrovandi et al. | |

(Continued)

FOREIGN PATENT DOCUMENTS

| CN | 1502177 A | 6/2004 |
|---|---|---|
| CN | 101018074 A | 8/2007 |

(Continued)

OTHER PUBLICATIONS

International Search Report and Written Opinion—PCT/US2009/038470—International Search Authority—European Patent Office, Jul. 31, 2009.
Taiwan Search Report—TW098110245—TIPO—Jul. 16, 2012.

*Primary Examiner* — Shuwang Liu
*Assistant Examiner* — Ross Varndell
(74) *Attorney, Agent, or Firm* — Abdollah Katbab

(57) ABSTRACT

An apparatus including a configurable demodulation architecture which includes a control module and a demodulation engine. The control module includes a set of one or more control fields. The demodulation engine includes a spatial whitening module, a Minimum Mean Square Estimation (MMSE) module, at least a first Maximal Ratio Combining (MRC) module, and at least one multiplexer. Further, the multiplexer is coupled to the instruction module and controlled based on the control fields to select at least one of the MMSE module or MRC module.

31 Claims, 7 Drawing Sheets

(56) References Cited

U.S. PATENT DOCUMENTS

| | | |
|---|---|---|
| 2006/0045062 A1 | 3/2006 | Gorokhov et al. |
| 2006/0072500 A1* | 4/2006 | Kent et al. ............... 370/328 |
| 2006/0083195 A1* | 4/2006 | Forenza et al. ............ 370/328 |
| 2006/0222096 A1 | 10/2006 | Guo et al. |
| 2008/0310486 A1 | 12/2008 | Zhu et al. |
| 2009/0111542 A1 | 4/2009 | Luschi et al. |
| 2010/0067366 A1 | 3/2010 | Nicoli |

FOREIGN PATENT DOCUMENTS

| | | |
|---|---|---|
| JP | 2003258763 A | 9/2003 |
| JP | 2003536317 A | 12/2003 |
| JP | 2005354346 A | 12/2005 |
| WO | 0195509 A1 | 12/2001 |
| WO | WO2006138621 | 12/2006 |

* cited by examiner

HARDWARE ENGINE TO DEMOD SIMO, MIMO, AND SDMA SIGNALS

CLAIM OF PRIORITY UNDER 35 U.S.C. §119

The present application for Patent claims priority to Provisional Application No. 61/040,307 entitled "HARDWARE ENGINE TO DEMOD SIMO, MIMO AND SDMA SIGNALS" filed Mar. 28, 2008 and Provisional Application No. 61/040,462 entitled "CONFIGURATION FOR IMPLEMENTING A TASKLIST PROVIDING PROCESSING OF WHITENED SIGNALS" filed Mar. 28, 2008, and assigned to the assignee hereof and hereby expressly incorporated by reference herein.

FIELD OF DISCLOSURE

The invention relates to communications in a telecommunications system, and more particularly to a hardware engine to demodulate Single Input Multiple Output (SIMO), Multiple Input Multiple Output (MIMO) and Space Diversity Multiple Access (SDMA) signals in a telecommunications system.

BACKGROUND

Wireless communication systems are widely deployed to provide various types of communication content such as voice, data, and so on. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, 3rd Generation Partnership Project (3GPP) Long Term Evolution (LTE) systems, and orthogonal frequency division multiple access (OFDMA) systems.

Generally, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out, multiple-in-signal-out or a multiple-in-multiple-out (MIMO) system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels; where $N_S \leq \min\{N_T, N_R\}$. Each of the $N_S$ independent channels corresponds to a dimension. The MIMO system can provide improved performance (e.g., higher throughput and/or greater reliability) if the additional dimensionalities created by the multiple transmit and receive antennas are utilized.

A MIMO system supports time division duplex (TDD) and frequency division duplex (FDD) systems. In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point. Furthermore, a wide variety of transmit/receive methodologies currently exist using multiple channels, such as, for example, MIMO, SIMO, SDMA, Space-time block coding based transmit diversity (STTD, Space-frequency block coding based transmit diversity (SFTD), etc. Each of these methodologies has various situational advantages and disadvantages. However, currently existing wireless devices may lack the ability to utilize all of these methodologies in a streamlined manner.

Accordingly, there is a need for new architectures and processes which can flexibly utilize a wide variety of these multi-channel transmit/receive technologies. Moreover, by preprocessing symbols prior to modulation, the efficiency of multi-channel demodulation techniques can be improved.

SUMMARY

Exemplary embodiments of the invention are directed to systems and methods for demodulation operations.

Accordingly an embodiment can include a an apparatus including a configurable demodulation architecture comprising: a control module including a set of one or more control fields; and a demodulation engine including; a spatial whitening module; a Minimum Mean Square Estimation (MMSE) module; at least a first Maximal Ratio Combining (MRC) module; and at least one multiplexer coupled to the instruction module and controlled based on the control fields to select at least one of the MMSE module or MRC module.

Another embodiment can include a method for performing demodulation operations, the method comprising: establishing a set of one or more control fields; performing a spatial whitening operation on input data; filtering the whitened input data using at least one of Minimum Mean Square Estimation (MMSE) or Maximal Ratio Combining (MRC); and selecting the MMSE or MRC filtering based on the control fields to produce demodulation data from the whitened input data.

Another embodiment can include a computer-readable medium comprising instructions which, when executed by at least one processor, operates to provide processing of communication signals, the computer-readable medium comprising: instructions to establish a set of one or more control fields; instructions to perform a spatial whitening operation on input data; instructions to filter the whitened input data using at least one of Minimum Mean Square Estimation (MMSE) or Maximal Ratio Combining (MRC); and instructions to select the MMSE or MRC filtering based on the control fields to produce demodulation data from the whitened input data.

Another embodiment can include an apparatus in a wireless communications system, the apparatus comprising: means for establishing a set of one or more control fields; means for performing a spatial whitening operation on input data; means for filtering the whitened input data using at least one of Minimum Mean Square Estimation (MMSE) or Maximal Ratio Combining (MRC); and means for selecting the MMSE or MRC filtering based on the control fields to produce demodulation data from the whitened input data.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1:
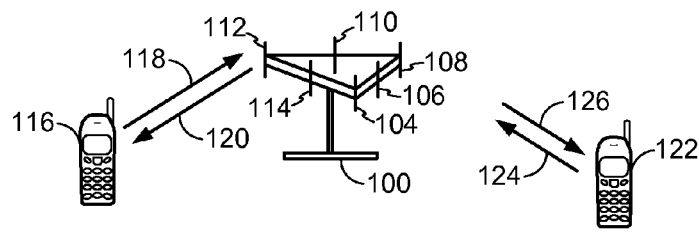
FIG. 1 illustrates a multiple access wireless communication system according to one embodiment.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Low Chip Rate (LCR). cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

Single carrier frequency division multiple access (SC-FDMA), which utilizes single carrier modulation and frequency domain equalization, is a technique that has similar performance and essentially the same overall complexity as that of an OFDMA system. SC-FDMA signals have a lower peak-to-average power ratio (PAPR) because of its inherent single carrier structure. SC-FDMA has drawn great attention; especially regarding uplink communications where a lower PAPR greatly benefits the mobile terminal in terms of transmit power efficiency. Currently, it is a working assumption for an uplink multiple access scheme in 3GPP Long Term Evolution (LTE), or Evolved UTRA that SC-FDMA be utilized.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Referring to FIG. 1, a multiple access wireless communication system according to one embodiment is illustrated. An access point 100 (AP) includes multiple antenna groups; one including antenna elements 104 and 106, another including antenna elements 108 and 110, and an additional including antenna elements 112 and 114. In FIG. 1, only two antennas are shown for each antenna group, however it is understood by one of ordinary skill in the art, that more or fewer antennas may be utilized for each antenna group. Access terminal 116 (AT) is in communication with antenna elements 112 and 114, where antenna elements 112 and 114 transmit information to access terminal 116 over forward link 120 and receive information from access terminal 116 over reverse link 118. Access terminal 122 is in communication with antenna elements 106 and 108, whereas antenna elements 106 and 108 transmit information to access terminal 122 over forward link 126 and receive information from access terminal 122 over reverse link 124. In a FDD system, communication links 118, 120, 124 and 126 may use different frequency for communication. For example, forward link 120 may use a different frequency than that used by reverse link 118.

Each group of antennas and/or the area in which they are designed to communicate is often referred to as a sector of the access point. In the embodiment, antenna groups each are designed to communicate to access terminals in a sector, of the areas covered by access point 100.

In communication over forward links 120 and 126, the transmitting antennas of access point 100 may utilize beamforming in order to improve the signal-to-noise ratio of forward links for the different access terminals 116 and 124.

Also, an access point using beamforming to transmit to access terminals, scattered randomly through its coverage area, can cause less interference to access terminals in neighboring cells than an access point transmitting through a single antenna to all its access terminals.

An access point may be a fixed station used for communicating with the terminals and may also be referred to as an access point, a Node B, or some other terminology. An access terminal may also be called an access terminal, user equipment (UE), a wireless communication device, terminal, access terminal or some other terminology.

Figure 2:
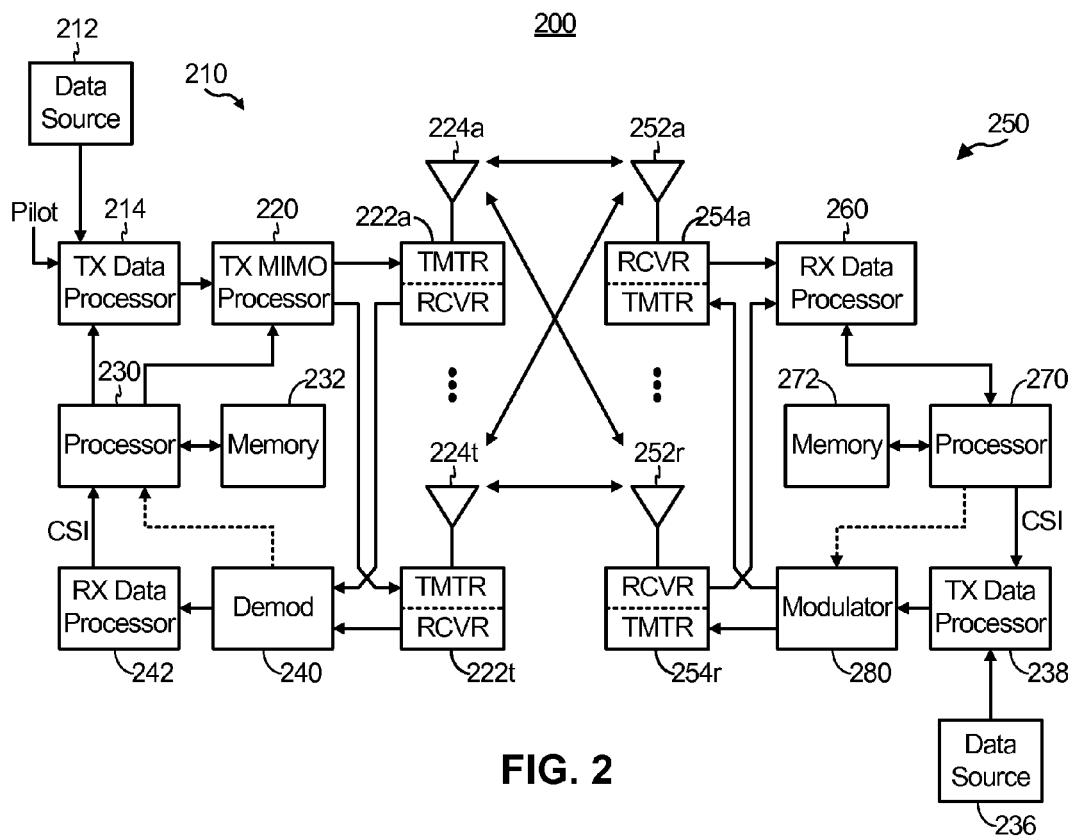
FIG. 2 is a block diagram of an exemplary communication system.

FIG. 2 is a block diagram of an embodiment of an AP 210 (also known as the access point) and an AT 250 (also known as access terminal) in a MIMO system 200. At the AP 210, traffic data for a number of data streams is provided from a data source 212 to a transmit (TX) data processor 214.

In an embodiment, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides $N_T$ modulation symbol streams to $N_T$ transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transmitters 222a through 222t are then transmitted from $N_T$ antennas 224a through 224t, respectively.

At AT 250, the transmitted modulated signals are received by $N_R$ antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the $N_R$ received symbol streams from the $N_R$ receivers 254 based on a particular receiver processing technique to provide $N_T$ "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at AP 210.

A processor 270 provides control to the AT 250 and provides an interface to memory 272, RX Data processor 260 and TX Data processor 238. A TX data processor 238 receives traffic data for a number of data streams from a data source 236, modulated by a modulator 280, conditioned by transmitters 254a through 254r, and transmitted back to AP 210.

At AP 210, the modulated signals from AT 250 are received by antennas 224, conditioned by receivers 222, demodulated by a demodulator 240, and processed by a RX data processor 242 to extract the reverse link message transmitted by the AT 250. A processor 230 provides control to the AP 210 and provides an interface to memory 232, TX Data processor 214 and TX MIMO Processor 220.

Figure 3:
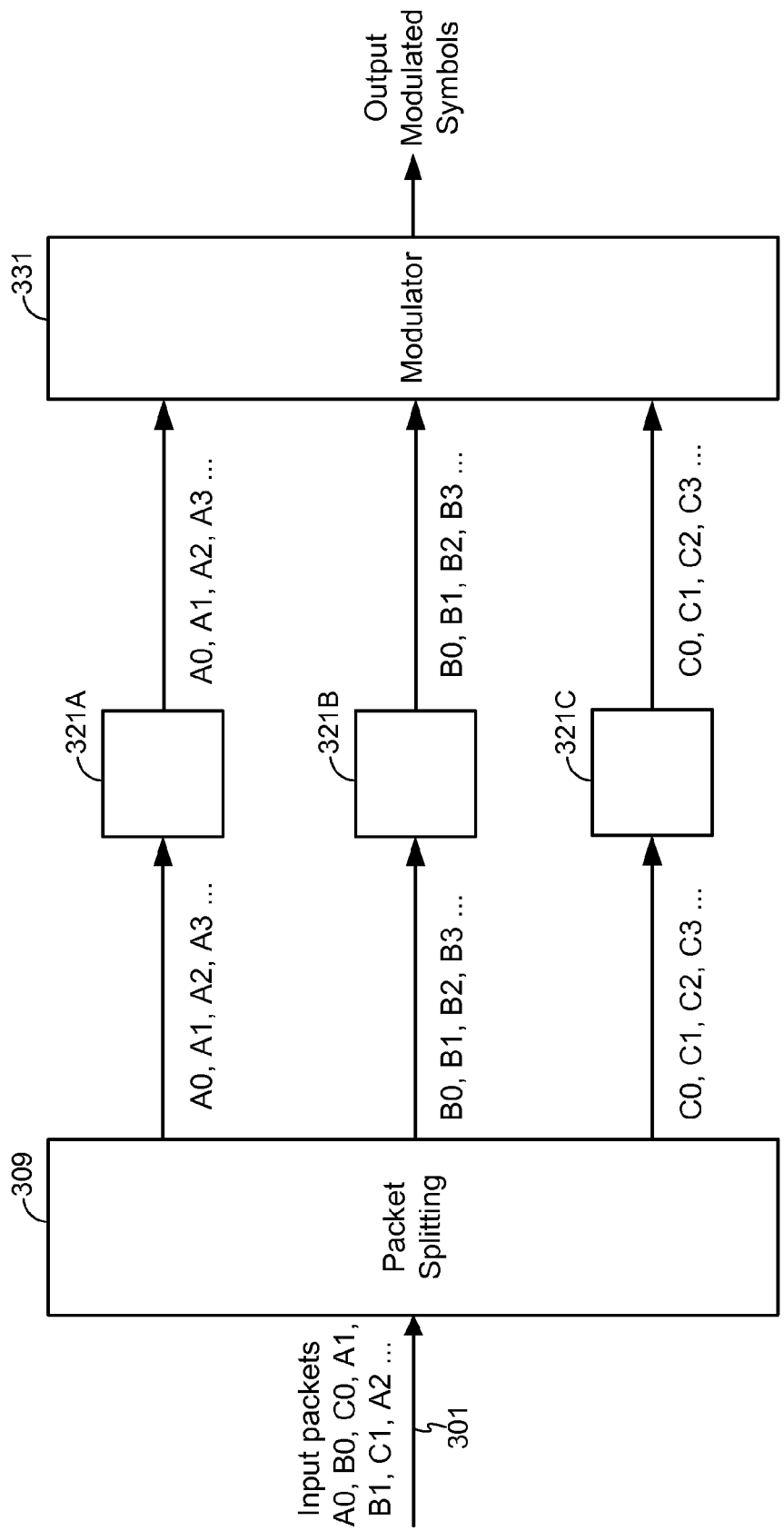
FIG. 3 is a block diagram of an exemplary transmission architecture for arranging packets of data.

FIG. 3 depicts an exemplary transmitting architecture 300. As suggested in FIG. 3, a packet of information Input Packet 301 can be split into a number of sub-packets {a, b, c, ... }. Afterwards, each sub-packet is received by blocks 321a-321c. Blocks 321a-321c may perform a number of standard processes. For example, a Cyclic Redundancy Check (CRC) checksum, encoding, channel interleaving, sequence repetition and data scrambling. The resultant processed sub-packets may then be combined into a larger architecture (described further below), then modulated by Modulator 331 and then transmitted according to an OFDM scheme, and transmitted according to a temporal architecture of frames and super-frames.

Figure 4:
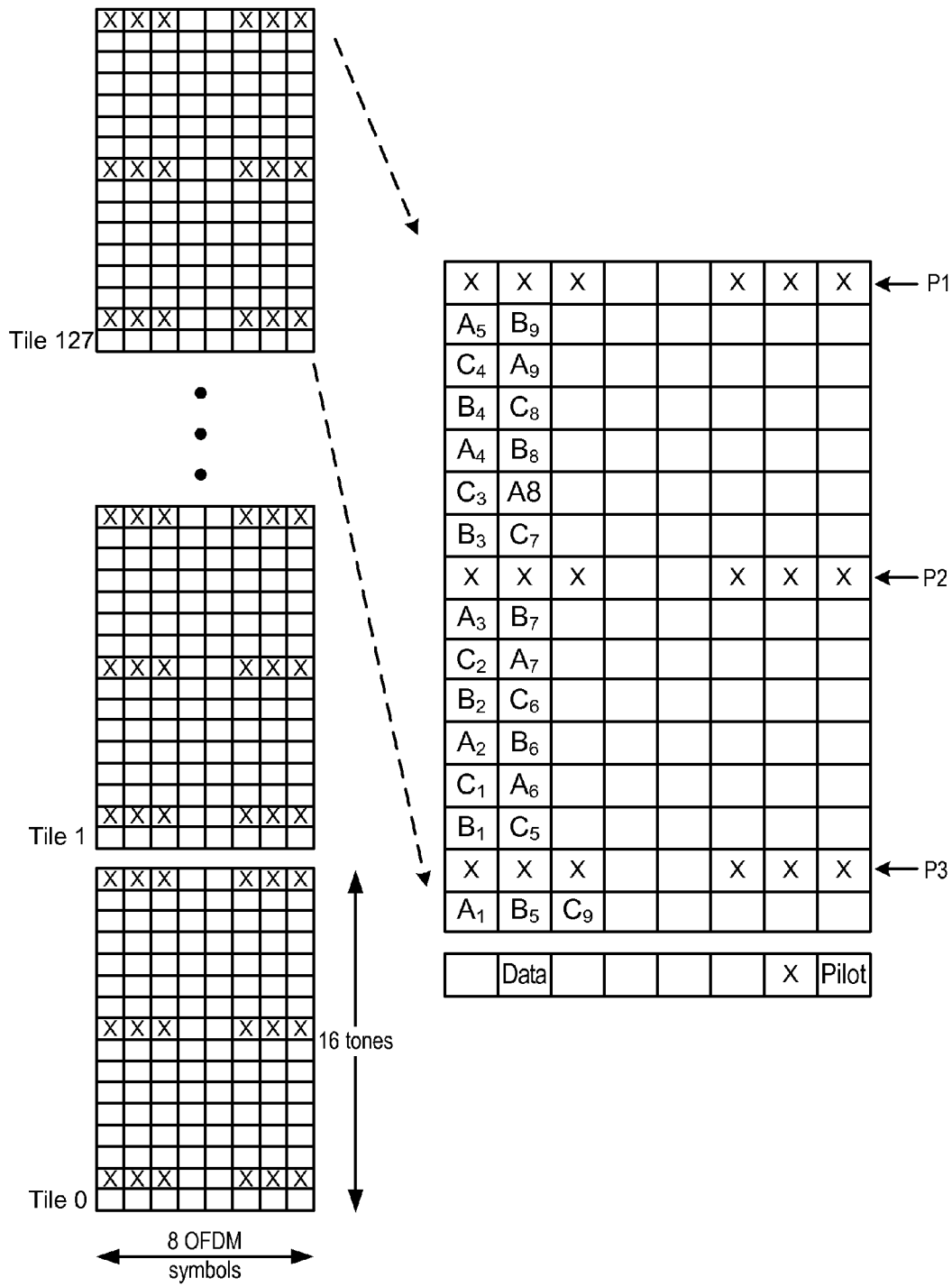
FIG. 4 depicts an exemplary logical arrangement of OFDM data.

For various blocks of data in a frame/super-frame architecture, OFDM signals and data may be organized into sub-blocks, called "tiles" in this disclosure. These tiles may be generated in the receivers shown in FIGS. 5, 6 and 7. FIG. 4 shows an example of an OFDM signal broken into 128 tiles; with each tile being made from 16 separate tones (or sub-channels) over 8 OFDM symbols such that each tile may consist of as many as 128 symbols. The format of FIG. 4 shows an OFDM physical layer that provides a 3-D time-frequency-space grid that may be used according to a Block Hopping Mode where some of these tiles may are assigned to an AT.

As shown in FIG. 4, each of the various tiles can have both data symbols and pilot symbols, with data symbols being used to carry information and pilot symbols being used to perform a wide variety of tasks, some of which may be explained further below, noting that an orthogonal pilot sequence from an AP Tx antenna can allow channel and interference estimation per layer.

Again, non-pilot symbols can be occupied by data from several subpackets, where symbols from a subset of subpackets are "painted" on non-pilot tones in a round-robin fashion across one or more tiles.

Depending on a desired assignment of tiles to data, payload data may be effectively arranged. For example, in FIG. 4 tile 127 is assigned to hold three sub-packets of information {a, b, c} with sub-packet {a} containing data symbols (a0, a1, a2, a3 ... }, sub-packet {b} containing data symbols (b0, b1, b2, b3 ... }, and sub-packet {c} containing data symbols (c0, c1, c2, c3 ... }. However, this arrangement of sub-packet data within a tile is exemplary and does not preclude other arrangement patterns. Note that the various symbols that are interspersed together on tile 127 in a process/format may be referred to as sub-packetization or "painting." Sub-packetization may allow for the pipelining of demodulation and decoding operations for different sub-packets. In this context, pipelining may refer to the concurrent operation of the demodulation operation on a tile while the decoding operation can happen on a sub-packet, which can span tiles that may already have been demodulated. Furthermore, it is noted that the sub-packets of information contained within the tiles shown in FIG. 4 may vary. For example, in one embodiment the tiles may contain information pertaining to demodulated data (I, Q, SNR) for each symbol/tone combination. However, in another embodiment, the tiles may contain information pertaining to channel interpolation/estimation data (for example, channel estimation coefficients).

Figure 5:
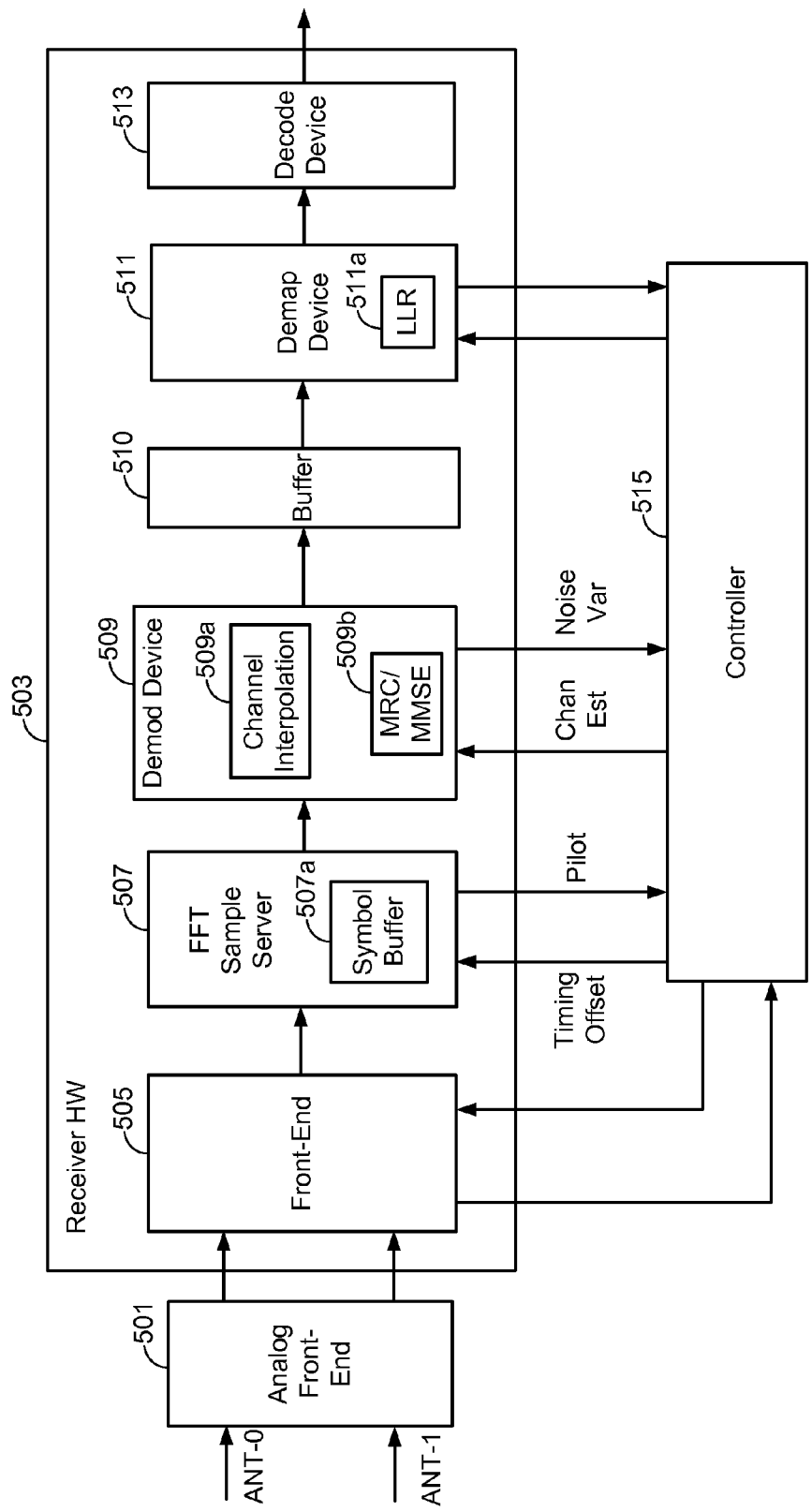
FIG. 5 depicts an exemplary hardware receiver architecture with supporting processor.

FIG. 5 depicts an exemplary hardware receiver architecture 503 with supporting processor. As shown in FIG. 5, two antennas ANT 0 and ANT 1 are shown leading to an analog front-end 501, which may perform various processes on the received signals, such as buffering, filtering, mixing and analog to digital conversion (ADC) to provide two streams of digitized data to a digital front-end of the hardware receiver architecture 505.

The digital front-end of the hardware receiver architecture 505 can process the received data including such processes, as DC offset correction, digital filtering, IQ correction, frequency correction and digital gain control. The digital front-end 505 may then provide the digitally processed data as dual data streams to the FFT sample server/engine 507, which in turn may process the OFDM data using FFTs (or DFTs) under control of Controller 515, which may be any form of sequential instruction processing machine executing software/firmware. Further, FFT sample server/engine 507 may include a sample server and a symbol buffer 507a.

Controller 515 may perform channel estimation. It is well known that a wireless channel may introduce arbitrary time dispersion, attenuation, and phase shift in a received signal over a communications channel. Channel estimation may be used to form an estimate of the time, amplitude and/or phase shift caused by the wireless channel from the available pilot information. Channel estimation may remove the effect of the wireless channel and allows subsequent symbol demodulation. Channel estimation may be implemented by any number of different algorithms. Controller 515 receives pilot data from FFT sample server/engine 507, which can be stored in Symbol Buffer 507a. Further, Controller 515 sends channel estimation data and noise variance data to Demod Device/Engine 509.

The FFT symbol data of the FFT sample server/engine 507 may then be provided to the Demod Engine 509, which may perform any number of demodulation operations, such as channel interpolation 509a, Maximum Ratio Combining (MRC)/Minimum Mean Square Error (MMSE) operations 509b, to produce dual demodulated outputs with each output arranged logically in a manner consistent with the tiles of FIG. 4. Note that each entry of each tile output by the Demod Engine 509 may include three components including a real portion (I), an complex portion (Q) and a related SNR. Further, in one embodiment a Buffer 510 may be positioned after the Demod Engine 509.

The outputs of the Buffer 510 may be further processed by Demap Engine 511 and Decode Engine 513 in manners more fully discussed below. The Demap Engine 511 may include a log-likelihood ratio (LLR) engine 511a that can convert I, Q and SNR data to soft bits. Further, the Demap Engine 511 can reorder the data format from tile-based to packet-based. The exemplary Demap Engine 511 may include a log-likelihood ratio (LLR) engine 511a, a sub-packetization engine, a descrambler and a de-interleaver. The LLR Engine 511a can be responsible for generating Log-Likelihood-Ratios, which may convey the soft information needed/useable by the Decode Engine 513. In the present embodiment, LLRs may be generated independently for two layers in MIMO arrangements. The inputs may include demodulated I, Q, and SNR data—per layer for each tone and Modulation Order. The output may include Log-Likelihood-Ratios (LLRs) for 2-bit data (QPSK), 3-bit data (8PSK), 4-bit data (16 QAM) and/or 6-bit data (64 QAM).

The Decode Engine 513 may include an LLR Buffer, a Turbo Decoder and a Viterbi Decoder. The Decode Engine 513 performs the basic operations of a standard decoder. The Turbo Decoder may include Turbo Codes/Decoders that are high-performance error correction codes to achieve maximal information transfer over a limited-bandwidth communication link in the presence of data-corrupting noise. The Viterbi Decoder may use the Viterbi algorithm for decoding a bitstream that has been encoded using forward error correction based on a Convolutional code.

Figure 6:
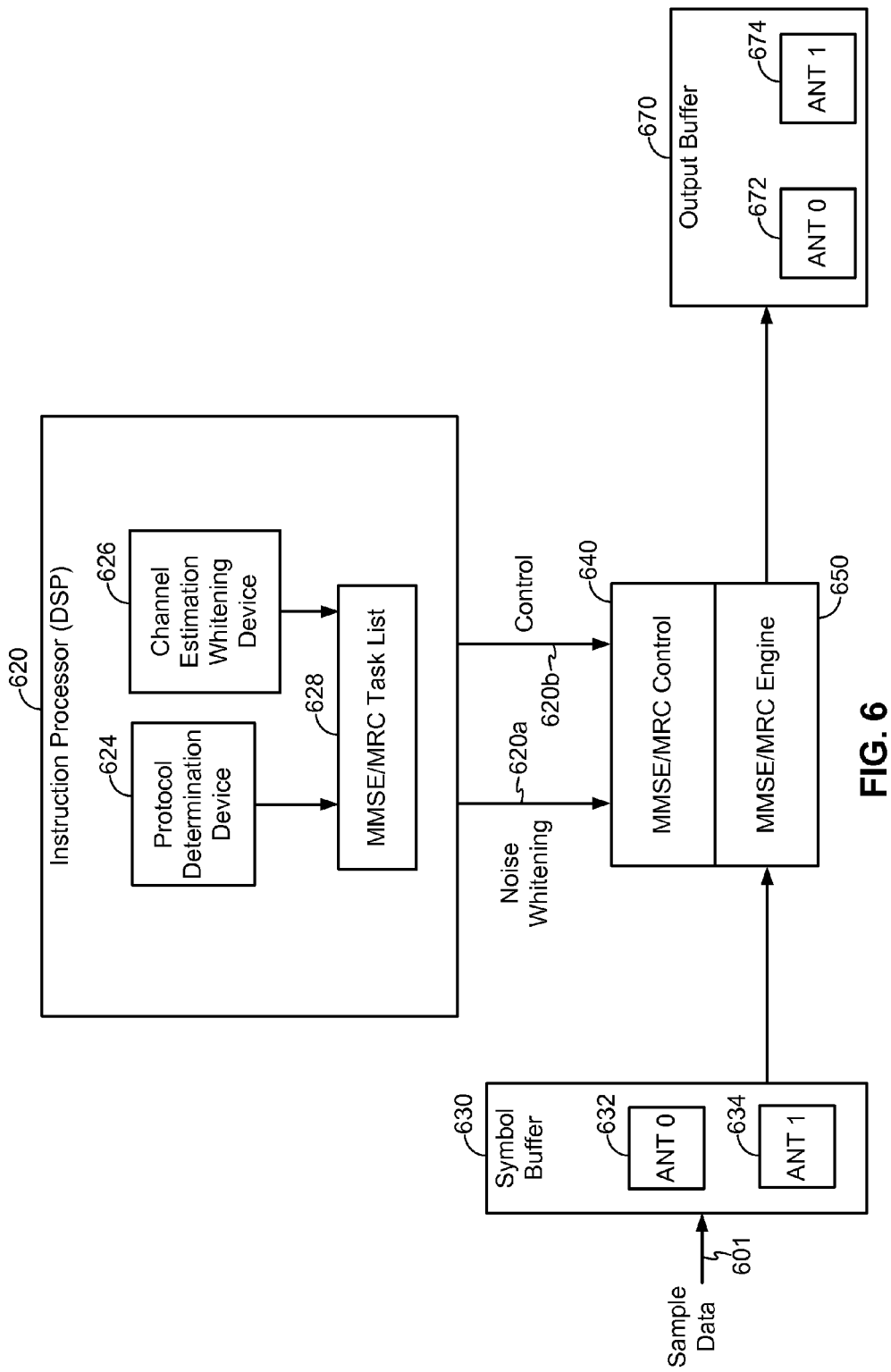
FIG. 6 is a schematic block diagram showing a relationship between an exemplary processing system and an MMSE/MRC processing engine.

While the embodiment of receiver 503 was shown using only two receive antennas ANT-0 and ANT-1, it is understood that this arrangement is merely exemplary and in no way should it be considered as restrictive. Various embodiments of the invention may use any plurality of receive antennas/channels FIG. 6 is a schematic block diagram showing a relationship between an exemplary processing system and an MMSE/MRC processing engine, such as that portrayed in the Demod Engine 509 of FIG. 5. As shown in FIG. 6, the processing system may include an instruction processor (DSP) 620, input data symbol buffer 630, an MMSE/MRC control block 640 and a corresponding engine 650, and an output buffer 670.

The instruction processor 620 may include a protocol determination device 624, a channel estimation whitening device 626 and a task list 628. In operation, the instruction processor 620 can determine the number of transmit antennas used by a transmitting AP via the protocol determination device 624, and further determines various aspects of the protocol of received signals. The protocol determination device 624 may also determine the type of traffic assignment that is utilized via the use of a control packet. The protocol determination device 624 can also determine the type of modulation utilized and whether MIMO, SIMO or SDMA is utilized. Further, the protocol determination device 624 may also determine whether MMSE or MRC is utilized.

The channel estimation whitening device 626 can calculate noise whitening computations based upon channel estimate data and pilot data. Further, the channel estimation whitening device 626 can accommodate MMSE/MRC processing. In various protocols, for example such as in an Ultra Mobile Broadband (UMB) system, the Forward Link (FL) transmissions can be sent in Single Input Multiple Output (SIMO) mode or MIMO mode, and the UMB-AT may use MRC or MMSE processing to respectively demodulate such signals. As MMSE and MRC demod algorithms are computationally intensive, care is taken to optimize their complexity for HW implementation in order to save area and power. Further, these algorithms can be simplified (up to 50% reduction in complex multiplies) if the noise across the multiple receive antennas is assumed to be uncorrelated. However in practice, since the noise across the receive antennas is correlated, this is not often achievable. As a result, in order to correct for the correlated noise, the channel estimation whitening device 626 can perform the following operations: 1) compute a spatial correlation matrix for a received signal, 2) compute a respective "whitening transform", and 3) whiten the resultant channel estimates. Furthermore, the actual data may be whitened in the Demod hardware using the whitened channel estimates.

As shown in FIG. 6, the whitened channel estimates 620a, as well as a task list (control) information 620b, may be provided to the MMSE/MRC engine 650 via MMSE/MRC control device 640.

The MMSE/MRC task list 628 is a number of parameters that the firmware may collect/process that can be passed to the hardware in order to perform demodulation. According to the above architecture, any number of instructions, variables, and/or data may be held in the MMSE and MRC Engine Task List 628 for use by the MMSE and MRC control block 640. As non-limiting examples, the MMSE and MRC Engine Task List 628 may include: variable(s) representing a sample start address, instructions for reading or supplying a sample start address of buffer 630, information as to the number of transmit antennas used, information regarding signal protocol, information regarding the type of transmit mode used, information regarding whether MMSC or MRC is enabled, information regarding the modulation order (i.e. for 64-QAM is 6 bits per symbol, for 8PSK is 3 bits per symbol and for QPSK is 2 bits per symbol), information regarding the number of transmitters that are utilized, and anything else that may be used in order to perform MMSE or MRC. The contents of the MMSE and MRC Engine Task List 628 may be held in firmware or memory, and may be updated and modified with new or different instructions, variables, and/or data as needed. Note that the instructions, variables, and or data held in the MMSE and MRC Engine Task List 628 can be requested by the MMSE and MRC control block 640 and stored in registers therein, or can be pushed into the MMSE and MRC control block 640 by the instruction processor 620.

The MMSE/MRC control block 640 receives a task list from information processor 620 and feeds numerous parameter inputs to the MMSE/MRC engine 650. As non-limiting examples, the parameters passed to the MMSE/MRC engine 650 may include: a scaling factor, $\beta$ (discussed below) which reduces bitwidths, whitening coefficients, correlation matrix ($R_{vv}$) obtained from the instruction processor 620 (discussed below), and a Cholesky factorization based on a whitening transform, $W = R_{vv}^{-1/2}$ (discussed below).

The MMSE/MRC engine 650 receives various parameters from the MMSE/MRC control block 640.

During an exemplary operation, symbol buffer 630 receives sample data 601 and provides an output to MMSE/MRC engine 650. The symbol buffer 630 may contain data (frequency domain) and be similar in function to that shown in FIG. 4. For example, each tile may contain 8 symbols and 16 tones, where the tiles are filled with tones and pilot data.

The MMSE/MRC engine 650 can use the noise whitening information 620a and control information 620b from instruction processor 620 (via MMSE/MRC control block 640) in order to whiten the data provided by the data symbol buffer 630. The MMSE/MRC engine 650 provides an output to output buffer 670.

The output buffer 670 receives demodulated data from MMSC/MRC engine 650. The output buffer 670 may contain data (I, Q and SNR) and be similar in function as to that shown in FIG. 4. Furthermore, the output buffer 670 may be contained within demod device 509 (not shown).

Further, the radio architecture shown in FIG. 6 may be utilized for either MMSE or MRC functions. Specifically, MMSE/MRC engine 650 may be utilized for either MMSE or MRC even though the MMSE and MRC methods both compute different filter computations (shown below). As a result, the radio architecture shown in FIG. 6 is flexible and allows for the operation of various multichannel transmit/receive methodologies, including both MIMO and SIMO estimations.

Figure 7:
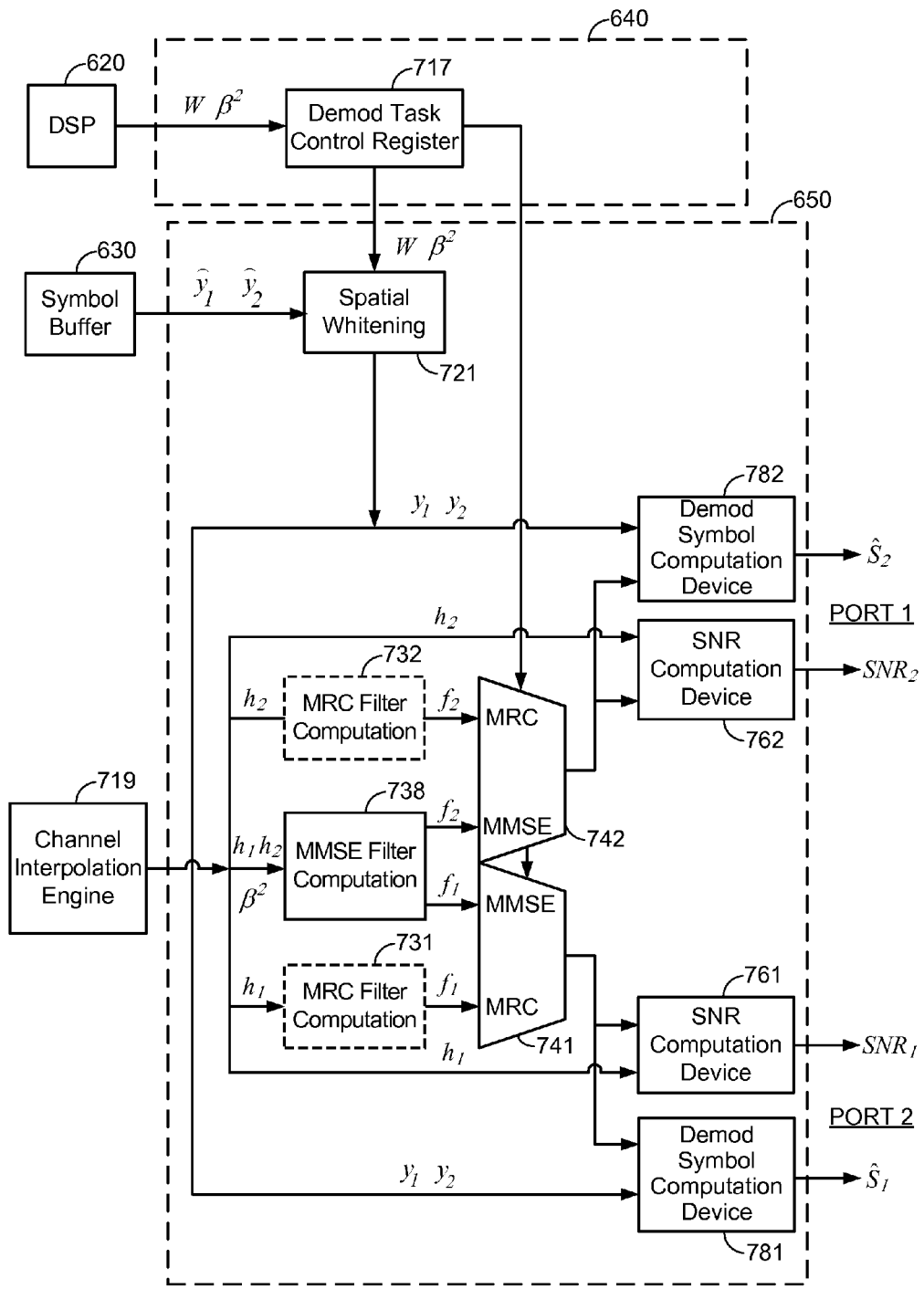
FIG. 7 is a schematic block diagram showing channel estimation implemented using MMSE and MRC with a whitening engine.

FIG. 7 is a schematic block diagram showing channel estimation implemented using MMSE and MRC with a whitening engine. This architecture can be useful for various multichannel transmit/receive methodologies, including both MIMO estimations and SIMO estimations.

In operation, DSP 620 can provide information to demodulation task control registers 717, and channel interpolation engine 719.

The channel interpolation engine 719 may provide a channel estimate ($h_1$, $h_2$) per tone to MMSE/MRC engine 650.

The spatial whitening device 721 can receive the whitening channel estimates (W, $\beta^2$), and whitens the FFT data ($\hat{y}_1$, $\hat{y}_2$) received from FFT symbol buffer 630 using the whitened channel estimates (W, $\beta^2$), whereafter the following components may perform MMSE or MRC estimation using the whitened FFT data ($y_1$, $y_2$).

The overall process of whitening and estimating is outlined in the equations below.

The signal model for a tone transmitted on two transmit antennas and received on two receive antennas is:

$$\hat{y} = \hat{H}s + v \qquad \text{Equation (2a)}$$

where:

$$\hat{y} = [\hat{y}_1 \hat{y}_2]^T \qquad \text{Equation (2b)}$$

is the received data vector;

$$s = [s_1 s_2]^T \qquad \text{Equation (2c)}$$

is the vector symbol that is to be demodulated;

$$\hat{H} = \begin{bmatrix} \hat{h}_1 & \hat{h}_2 \end{bmatrix} = \begin{bmatrix} \hat{h}_{11} & \hat{h}_{12} \\ \hat{h}_{21} & \hat{h}_{22} \end{bmatrix} \qquad \text{Equation (2d)}$$

is the estimated channel matrix;

$$v = [v_1 v_2]^T \qquad \text{Equation (2e)}$$

is the noise vector observed at the receive antennae with a correlation matrix, $R_{vv}$, obtained from the instruction processor 620;

$$R_{vv} = \begin{bmatrix} \sigma_1^2 & \rho\sigma_1\sigma_2 \\ \rho^*\sigma_1\sigma_2 & \sigma_2^2 \end{bmatrix} \qquad \text{Equation (3)}$$

$$W = \beta \frac{1}{\sqrt{1-|\rho|^2}\,\sigma_1\sigma_2} \begin{bmatrix} \sqrt{1-|\rho|^2}\,\sigma_2 & 0 \\ -\rho^*\sigma_2 & \sigma_1 \end{bmatrix} \qquad \text{Equation (4)}$$

is the Cholesky factorization based on the whitening transform, $W = R_{vv}^{-1/2}$ $\beta$ is a scaling introduced to reduce bitwidths.

An operation to pre-whiten the input ($\hat{y}_1$, $\hat{y}_2$) and channel estimate ($h_1$, $h_2$) is performed to simplify computation according to: (1) MMSE with pre-whitening 20-Complex Multiplies+2-Real Divides; and (2) MMSE without pre-whitening 32-Complex Multiplies+5-Real Divides.

The operation to pre-whiten the input signal ($\hat{y}_1$, $\hat{y}_2$) and channel estimate ($h_1$, $h_2$) is performed by:

$$y = W\hat{y} \text{ and } H = W\hat{H} \qquad \text{Equation (5)}$$

MMSE filter:

$$f_1 = \left[ h_1 - h_2 \frac{h_2^* h_1}{1 - |h_2|^2} \right]^T \qquad \text{Equation (6)}$$

to swap indexes 1 and 2 for $f_2$

Bias:

$$g_1 = \left[ |h_1| - \frac{|h_2^* h_1|^2}{1 + |h_2|^2} \right]^T \quad \text{Equation (7)}$$

to swap indexes 1 and 2 for $g_2$

Interference:

$$\sigma_k^2 = g_k \quad \text{Equation (8)}$$

Demod SNR:

$$SNR_k = \frac{g_k^2}{\sigma_k^2} = g_k \quad \text{Equation (9)}$$

Demod Symbol:

$$\hat{s}_k = f^*_k y \quad \text{Equation (10)}$$

LLR Component:

$$L(s_k) = s_k(s_k SNR_k - 2\hat{s}_k) \quad \text{Equation (11)}$$

Returning to FIG. 7, the channel interpolation engine 719 interfaces with MRC filter computation 731 and 732 and MMSE filter computation 738.

MMSE filter computation 738 performs MMSE filter computation in accordance with the filter of equation 6.

MRC filter computation 731 and 732 perform MRC filter computation in accordance with the filter of equation 6. However, the estimated channel matrix for MRC operations contains an $h_2$ value equal to 0.

Multiplexers 741 and 742 can direct the appropriate data flow from MRC filter computation devices 731 and 732 and MMSE filter computation device 738. The output of multiplexers 741, 742 is connected to SNR computation device 761, 762 and demod symbol computation device 781, 782. Multiplexers 741, 742 are controlled by the control fields produced by demodulation task control registers 717 such that the demodulation data is at least based on computations from either of the MMSE and MRC circuits.

SNR computation devices 761, 762 compute the SNR ($SNR_1$, $SNR_2$) of the received signal from the multiplexers 741, 742 in accordance with equation 9. The SNR computation devices 761, 762 receive a channel estimate ($h_1$, $h_2$) from channel interpolation engine 719 and data from the multiplexers 741, 742.

The demod symbol computation devices 781, 782 compute the demodulated symbols ($\hat{s}_1$, $\hat{s}_2$) from the multiplexers 741, 742 in accordance with equation 10. The demod symbol computation devices 781, 782 receive whitened FFT data ($y_1$, $y_2$) and data from the multiplexers 741, 742.

An LLR block 511a may demap the symbol to a soft bit via use of equation 11 and the demodulated symbols ($\hat{s}_1$, $\hat{s}_2$) and SNR ($SNR_1$, $SNR_2$) of the received signal.

Accordingly, various modes of operation can be implemented dependent upon the operation of ports 1 and 2. However, it is understood that this is an exemplary illustration and that a plurality of ports may be utilized.

The device shown in FIG. 7 can operate in MMSE mode when the data is extracted from both Ports 1 and Port 2 every cycle.

The device shown in FIG. 7 can operate in MRC mode when the data is extracted from Port 2 every cycle.

The device shown in FIG. 7 can operate in SDMA mode when the MMSE/MRC engine 650 is run in the same manner as for MMSE, however, the data is extracted from alternating ports (1 and 2).

The device shown in FIG. 7 can operate in STTD mode when the MMSE/MRC engine 650 is run in the same manner as for MMSE, however, the data is extracted from ports 1 and 2 by combining them in post-processing.

The device shown in FIG. 7 can operate in SFTD mode when the MMSE/MRC engine 650 is run in the same manner as for MMSE, however, the data is extracted from ports 1 and 2 by combining them in post-processing.

Furthermore it is noted that when not in use, MRC filter devices 731, 732 and MMSE filter device 738 may be disabled and/or de-powered for energy savings.

While the embodiment shown in FIG. 7 was shown using only two output ports PORT 1 and PORT 2, it is understood that this arrangement is merely exemplary and in no way should it be considered as restrictive. Various embodiments of the invention may use any plurality of output ports.

Figure 8:
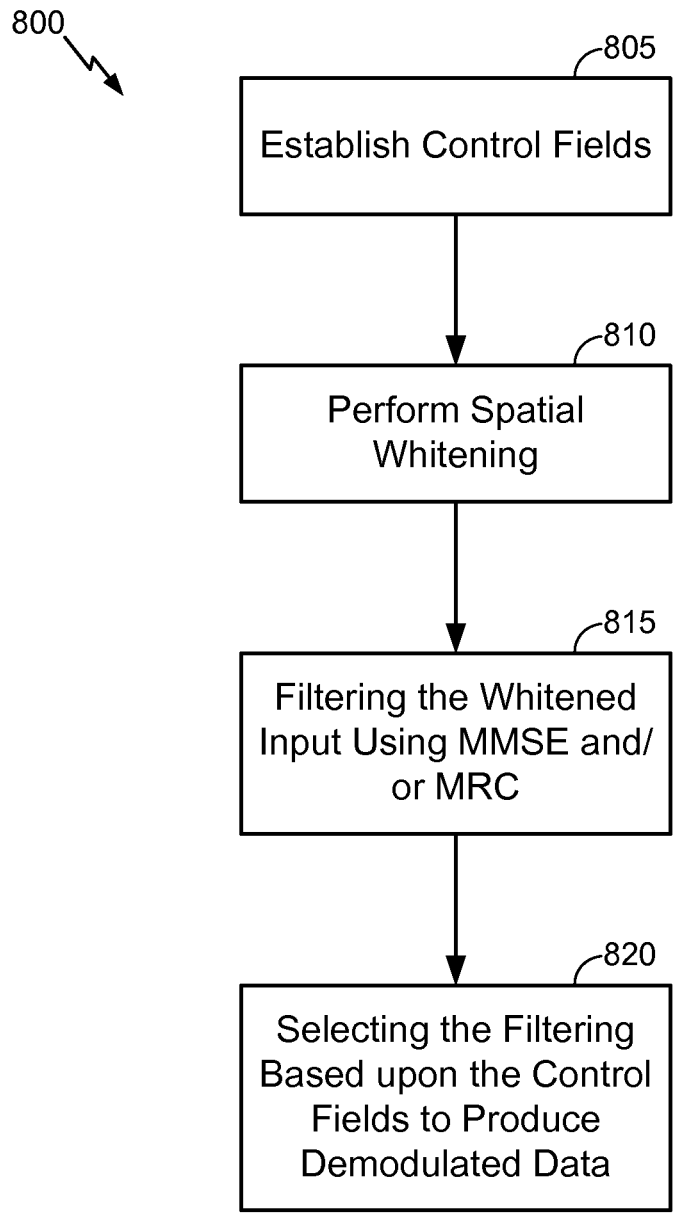
FIG. 8 depicts a flowchart showing an exemplary process performed by an embodiment of the hardware architecture.

FIG. 8 is a flowchart showing an exemplary process 800 that may be performed by an embodiment of the hardware architecture such as illustrated in FIGS. 6 and 7.

Initially, the DSP 620 may establish a set of one or more control fields, and then provide them to the Demod Task Control Register 717. (Block 805). Additionally, the DSP 620 may also generate whitening parameters (e.g., W, $\beta^2$) as described above. The whitening parameters may be provided to the spatial whitening module 721, which resides in the MMSE/MRC Engine 650. The spatial whitening module 721 may also receive the input data (e.g., $\hat{y}_1$, $\hat{y}_2$), and in conjunction with the whitening parameters, process the input data in order to produce whitened FFT data (e.g., $y_1$, $y_2$) (Block 810). Additionally, the channel estimate channel estimate ($h_1$, $h_2$) may also undergo pre-whitening operation.

Filter coefficients corresponding to MRC and/or MMSE can then be computed in MRC Filter Computation modules 731 and 732, and MMSE Filter Computation module 738, respectively. The whitened data (e.g., $y_1$, $y_2$) may then be filtered using the MMSE and/or the MRC coefficients (Block 815). The MMSE and/or MRC filtering may be selected, based upon the control fields, to produce demodulated data (e.g., $\hat{s}_1$, $\hat{s}_2$), which may be computed by the Demod Symbol Computation device 761 and/or 782. (Block 820). The selection may be performed by multiplexers 741 and/or 742 based upon the control fields provided by the Demod Task Register 717. The SNR associated with the demodulated data may be computed by SNR computation devices 761 and 762, using data provided by multiplexers 741 and/or 742, and the channel estimates provided by the channel interpolation engine 719.

It is understood that the specific order or hierarchy of steps in the processes disclosed is part of an example of exemplary approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for the processing of communication signals, the computer-readable medium including instructions to establish a set of one or more control fields, instructions to establish a sequential instruction logic which is capable of processing software commands, instructions to provide filtering according to at least one of Minimum Mean Square Estimation (MMSE) and Maximal Ratio Combining (MRC), instructions to multiplex the output of the filtering, instructions to control the multiplex operation by the control fields for producing demodulation data based on computations from either of the MMSE and MRC logic to produce a plurality of signals. Accordingly, the invention is not limited to illustrated examples and any means for performing the functionality described herein are included in embodiments of the invention.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. An apparatus including a configurable demodulation architecture comprising:
    a tangible, non-transitory computer-readable memory;
    a plurality of modules comprising processor executable code stored in the memory;
    a processor connected to the memory and configured to access and execute the following:
        a control module including a set of control fields including indications of a transmit mode used to transmit a signal to be demodulated and a modulation order, wherein the control module is configured to determine whether Multiple Input Multiple Output (MIMO), Single Input Multiple Output (SIMO), or Space Diversity Multiple Access (SDMA) is utilized;
        a Fast Fourier Transform (FFT) sample server configured to provide FFT symbol data; and
        a demodulation engine configured to receive the FFT symbol data, including:
            a spatial whitening module configured to process the FFT symbol data to provide whitened FFT data;
            a Minimum Mean Square Estimation (MMSE) module configured to receive the whitened FFT data;
            at least two Maximal Ratio Combining (MRC) modules configured to receive the whitened FFT data; and
            at least two multiplexers coupled to the control module and controlled based on the control fields to direct the data flow from the MMSE module and the MRC modules.

2. The apparatus of claim 1, wherein the demodulation engine is configured to receive configuration information including control data and whitening channel estimates from a task list via the control module, and to perform demodulation according to a demodulation scheme on a serial stream of data.

3. The apparatus of claim 2, wherein the stream of data is derived from a MIMO signal and MMSE data is provided to an output Port 1 and an output Port 2 every cycle.

4. The apparatus of claim 1, further comprising a plurality of output ports.

5. The apparatus of claim 4, wherein the plurality of output ports includes a first output port (Port 1) and a second output port (Port 2).

6. The apparatus of claim 5, wherein MRC data is provided to at least one port every cycle.

7. The apparatus of claim 5, wherein SDMA data is provided to alternating ports.

8. The apparatus of claim 5, wherein at least one of Space-time block coding based transmit diversity (STTD) or Space-frequency block coding based transmit diversity (SFTD) data is provided to both Port 1 and Port 2 every cycle.

9. The apparatus of claim 1, wherein the demodulation engine further comprises:
    a plurality of demodulation symbol computation devices; and
    a plurality of SNR computation devices, wherein each demodulation symbol computation device and SNR computation device is coupled to one of a plurality of output ports.

10. The apparatus of claim 9, wherein an output of a first multiplexer is coupled to a first demodulation symbol computation device and a first SNR computation device coupled to a first output port and an output of a second multiplexer is coupled to a second demodulation symbol computation device and a second SNR computation device coupled to a second output port.

11. A computer-implemented method for performing demodulation operations, the method comprising:
    establishing a set of control fields including indications of a transmit mode used to transmit a signal to be demodulated and a modulation order, wherein the control fields indicate whether Multiple Input Multiple Output (MIMO), Single Input Multiple Output (SIMO), or Space Diversity Multiple Access (SDMA) is utilized;
    providing the set of control fields to at least two multiplexers;

performing a spatial whitening operation on input data, wherein the input data is Fast Fourier Transform (FFT) symbol data received from a FFT sample server;

filtering the whitened input data using at least one of a Minimum Mean Square Estimation (MMSE) filter computation device or a plurality of Maximal Ratio Combining (MRC) filter computation devices;

directing a data flow from the MMSE filter computation device and the MRC filter computation devices with the two multiplexers based on the control fields to produce demodulation data from the whitened input data; and determining a signal-to-noise ratio (SNR) based on a channel estimate data and the data flow from the MMSE filter computation device and the MRC filter computation devices.

12. The method of claim 11, further comprising:
receiving configuration information including control data and whitening channel estimates from a task list; and
performing demodulation according to a demodulation scheme on a serial stream of data.

13. The method of claim 12, wherein the stream of data is derived from a MIMO signal and MMSE data is provided to an output Port 1 and an output Port 2 every cycle.

14. The method of claim 11, wherein the demodulated data is provided to a plurality of output ports.

15. The method of claim 14, further comprising providing the demodulated data to a first port (Port 1) and a second port (Port 2) in alternating cycles for SDMA operations.

16. The method of claim 14, further comprising providing the demodulated data to both a first port (Port 1) and a second port (Port 2) every cycle, and combining the demodulated data from the Port 1 and the Port 2 in post-processing every cycle for Space-time block coding based transmit diversity (STTD) or Space-frequency block coding based transmit diversity (SFTD) operations.

17. The method of claim 14, further comprising: providing the demodulated data to at least one of the plurality of output ports every cycle for MRC operations.

18. A computer program product, comprising
a tangible, non-transitory computer readable medium comprising code for causing a computer to process communication signals, comprising:
instructions to establish a set of control fields including indications of a transmit mode used to transmit a signal to be demodulated and a modulation order, wherein the control fields indicate whether Multiple Input Multiple Output (MIMO), Single Input Multiple Output (SIMO), or Space Diversity Multiple Access (SDMA) is utilized;
instructions to provide the set of control fields to at least two multiplexers;
instructions to perform a spatial whitening operation on input data, wherein the input data is Fast Fourier Transform (FFT) symbol data received from a FFT sample server;
instructions to filter the whitened input data using a Minimum Mean Square Estimation (MMSE) filter computation device or a plurality of Maximal Ratio Combining (MRC) filter computation devices;
instructions to direct a data flow from the MMSE filter computation device and the MRC filter computation devices with the two multiplexers based on the control fields to produce demodulation data from the whitened input data; and
instructions to determine a signal-to-noise ratio (SNR) based on channel estimate data and the data flow from the MMSE filter computation device and the MRC filter computation devices.

19. The computer program product of claim 18, further comprising:
instructions to receive configuration information including control data and whitening channel estimates from a task list; and
instructions to perform demodulation according to a demodulation scheme on a serial stream of data.

20. The computer program product of claim 19, wherein the stream of data is derived from a MIMO signal and MMSE data is provided to an output Port 1 and an output Port 2 every cycle.

21. The computer program product of claim 18, wherein the demodulated data is provided to a plurality of output ports.

22. The computer program product of claim 21, further comprising instructions to provide the demodulated data to a first port (Port 1) and a second port (Port 2) in alternating cycles for SDMA operations.

23. The computer program product of claim 21, further comprising instructions to provide the demodulated data to both a first port (Port 1) and a second port (Port 2) every cycle, and combining the demodulated data from the Port 1 and the Port 2 in post-processing every cycle for Space-time block coding based transmit diversity (STTD) or Space-frequency block coding based transmit diversity (SFTD) operations.

24. The computer program product of claim 21, further comprising: instructions to provide the demodulated data to at least one of the plurality of output ports every cycle for MRC operations.

25. An apparatus in a wireless communications system, the apparatus comprising:
means for establishing a set of control fields including indications of a transmit mode used to transmit a signal to be demodulated and a modulation order, wherein the control fields indicate whether Multiple Input Multiple Output (MIMO), Single Input Multiple Output (SIMO), or Space Diversity Multiple Access (SDMA) is utilized;
means for providing the set of control fields to at least two multiplexers;
means for performing a spatial whitening operation on input data, wherein the input data is Fast Fourier Transform (FFT) symbol data received from a FFT sample server;
means for filtering the whitened input data using at a Minimum Mean Square Estimation (MMSE) filter computation device or a plurality of Maximal Ratio Combining (MRC) filter computation devices;
means for directing a data flow from the MMSE filter computation device and the MRC filter computation devices with the two multiplexers based on the control fields to produce demodulation data from the whitened input data; and
means for determining a signal-to-noise ratio (SNR) based on channel estimate data and the data flow from the MMSE filter computation device and the MRC filter computation devices.

26. The apparatus of claim 25, further comprising:
means for receiving configuration information including control data and whitening channel estimates from a task list; and
means for performing demodulation according to a demodulation scheme on a serial stream of data.

27. The apparatus of claim 26, wherein the stream of data is derived from a MIMO signal and MMSE data is provided to an output Port 1 and an output Port 2 every cycle.

28. The apparatus of claim 25, wherein the demodulated data is provided to a plurality of output ports.

29. The apparatus of claim 28, further comprising means for providing the demodulated data to a first port (Port 1) and a second port (Port 2) in alternating cycles for SDMA operations.

30. The apparatus of claim 28, further comprising means for providing the demodulated data to both a first port (Port 1) and a second port (Port 2), and combining the demodulated data from the Port 1 and the Port 2 signals in post-processing every cycle for Space-time block coding based transmit diversity (STTD) or Space-frequency block coding based transmit diversity (SFTD) operations.

31. The apparatus of claim 25, further comprising: means for providing the demodulated data to at least one of the plurality of output ports every cycle for MRC operations.

* * * * *